United States Patent
Schroepfer

(10) Patent No.: US 9,355,377 B2
(45) Date of Patent: May 31, 2016

(54) CARBON DIOXIDE EMISSIONS OPTIMIZED SECURE CLOUD COMPUTING

(71) Applicant: Axel Schroepfer, Rheinstetten (DE)

(72) Inventor: Axel Schroepfer, Rheinstetten (DE)

(73) Assignee: SAP SE, Walldorf (DE)

( * ) Notice: Subject to any disclaimer, the term of this patent is extended or adjusted under 35 U.S.C. 154(b) by 429 days.

(21) Appl. No.: 13/926,926

(22) Filed: Jun. 25, 2013

(65) Prior Publication Data

US 2014/0379396 A1    Dec. 25, 2014

(51) Int. Cl.
*G06Q 10/06* (2012.01)
*G06F 9/44* (2006.01)
*G06F 9/45* (2006.01)
*G06F 9/455* (2006.01)

(52) U.S. Cl.
CPC ................................ *G06Q 10/0631* (2013.01)

(58) Field of Classification Search
CPC ...................................................... G06Q 10/06
See application file for complete search history.

(56) References Cited

U.S. PATENT DOCUMENTS

2003/0058238 A1\* 3/2003 Doak et al. ..................... 345/419
2009/0055754 A1\* 2/2009 Finn et al. ..................... 715/757
2009/0112541 A1\* 4/2009 Anderson et al. ................ 703/11
2014/0074647 A1\* 3/2014 Mukherjee ......... G06Q 30/0282
                                                    705/26.7
2014/0123292 A1\* 5/2014 Schmidt .................. H04L 67/10
                                                     726/25
2014/0156727 A1\* 6/2014 Almon ................ H04L 67/1097
                                                    709/203
2014/0177828 A1\* 6/2014 Loftus ..................... H04L 9/008
                                                      380/44

\* cited by examiner

*Primary Examiner* — Kevin Flynn
*Assistant Examiner* — Venay Puri
(74) *Attorney, Agent, or Firm* — Fountainhead Law Group P.C.

(57) ABSTRACT

Systems and method for deploying $CO_2$ emission and financial cost optimized secured algorithms to cloud computing environments are disclosed. Algorithms are converted into a single state assignment representation that includes a combination of statements that represent sub operations of the algorithm. Runtime and power consumption cost values associated with executing the statements in the cloud are calibrated by executing the statements in a particular configuration of a cloud some number of time with multiple security protocols and then analyzing the results. $CO_2$ emission and financial cost values are mapped to the calibrated runtime and power consumption cost values. The mapped $CO_2$ emission and financial cost values and the calibrated runtime and power consumption cost values are used by a linear program to optimize a partitioning vector of indicators that define which security protocol will be used to execute each statement in the cloud when the algorithm is deployed.

13 Claims, 6 Drawing Sheets

CARBON DIOXIDE EMISSIONS OPTIMIZED SECURE CLOUD COMPUTING

BACKGROUND

Unless otherwise indicated herein, the approaches described in this section are not prior art to the claims in this application and are not admitted to be prior art by inclusion in this section.

The present invention relates to secure cloud computing, and in particular, to systems and method for optimizing for financial cost, power consumption, and carbon dioxide ($CO_2$) emissions related to executing an algorithm in a secure cloud computing environment.

Many types of applications can be deployed in various types of cloud computing environments. Cloud computing systems allow software developers and users to run large scale applications using multiple high-performance computers or processors, generically referred to herein as processing units, without incurring the capital investment or maintenance costs associated with owning and operating such systems. Instead, cloud computing service providers charge users to execute applications in their cloud computing environment based on the number of processors used during execution and the time it takes those processors to execute the application. Accordingly, to control the cost of execution, the constituent algorithms of a particular application are often implemented in a particular cloud computing environments with various constraints and predetermined optimizations. The constraints and optimizations are typically concerned with the execution time and the number of processors used, and the balance between the two in order to reduce the overall cost of execution and/or the runtime. In some scenarios, it is possible to sacrifice responsiveness of the application for lower cost. However, in other scenarios, it is of utmost importance that the results from a particular application be returned as quickly as possible. Under such circumstances, a user may be willing to pay a premium to the cloud computing service provider for a larger allocation of processing units to make the application execute faster.

Because of the many business and technical advantages associated with their performance and cost flexibility, cloud computing systems are experiencing an increase in popularity. However, due to the nature of cloud computing that requires information to be transmitted to the cloud, many users are reluctant to execute applications with sensitive or proprietary data without first encrypting their portion of the data used. To address this need, various solutions for secure two-party computation have been developed. Secure two-party computation allows two parties to execute a function or algorithm in a cloud computing environment using private inputs without revealing their private inputs or relying on a trusted third party. Secure computation has many applications. For example, secure computation has been successfully deployed in various commercial, industrial, and financial settings.

While various protocols still compete for the best performance in secure computation, some advancement has been made in further improving performance of securely executing various applications by mixing security protocols used by the individual the sub operations of an application. For example, a security protocol can be selected for each of the sub operations of an application in order to optimize the time and/or cost of executing application as a whole. One particular example of secure cloud computing uses automatic selection of mixed security protocols for execution of sub operations. In such systems, linear programs are generated based on a performance models of the individual sub operations in the could computing configurations to be used (e.g., the number of processing units allocated for execution) to determine the mix of garbled circuit and the homomorphic encryption security protocols. FIG. 1 shows one example data flow 100 for partitioning the sub operations with mixed security protocols such that the runtime is minimized using a linear program based on a predetermined performance model.

As shown in FIG. 1, the data flow 100 begins with an application or, more generically, an algorithm 101, that is to be executed in a secure cloud computing environment. The algorithm 101 can be converted into a number of individual statements 105 of sub operations of the algorithm 101. The number of statements is arbitrary and can include up to N statements and be based on the size and complexity of the algorithm 101. Typically, each of the statements 105 is an expression that is converted according to a predetermined statement format, such as a single static assignment (SSA) statement format 115. In some systems, each of the converted SSA statements are predetermined such that the SSA operation cost value calibration 110 can be determined. The calibrated cost values of the SSA operation cost value calibration 110 are typically associated with the runtime of executing a corresponding SSA statement using a particular security protocol in a given configuration of the cloud. The SSA operation cost value calibration 110 is then be provided to the performance model 130. The performance model includes routines for predictively determining the costs values associated with executing a particular SSA statement in a particular security protocol within a specified cloud computing configuration. For example, the performance model 130 often includes routines for predicting the cost of executing a particular algorithm in terms of runtime based on the runtimes of all SSA statements. The linear program 140 may be set to generate a partitioning vector 125 that represents the assignment of a particular security protocol 120 to each one of the corresponding statements 105 in SSA format to minimize the runtime. In systems in which two security protocols are available, e.g. garbled circuits and homomorphic encryption, the partitioning vector 125 can be represented by a vector of binary values in which each one of the binary values is set to one of the available security protocols. The statements 105 in SSA format representing the algorithm 101 are then sent to the cloud computing environment for execution using security protocols defined by the partitioning vector to achieve the optimal or shortest runtime.

While runtime is an important factor with respect to performance of an algorithm, various regulatory and market forces, and consumer demands, have increased the pressure to optimize the execution algorithms in a cloud computing environment according to other factors. For example, it is becoming increasingly more important to be able to label or market execution of various cloud computing applications as being "green" with respect to $CO_2$ emissions, while also offering the best possible value with respect to direct and indirect costs associated with executing the applications in the cloud. Because some factors, such as runtime and power consumption, do not track linearly with $CO_2$ emissions and financial costs, it can be difficult to predict the associated costs values using traditional techniques. The runtime associated with executing a particular algorithm may be inversely proportional to the number of cloud processors being used for particular execution. However, the $CO_2$ emissions generated by such a configuration of processors may be greater than if the algorithm is executed using fewer processors because the additional processors maybe powered by a power plant with higher $CO_2$ emissions. Furthermore, the pricing structures published by the cloud computing service providers often do not track the number of processing units linearly. As such, the cost of a one or two additional processing units to decrease overall runtime maybe disproportionate to the cost of the base number of processing units. Accordingly, the interaction of the various costs values is complex.

Thus, there is a need for improved optimization of $CO_2$ emissions and financial costs for algorithms executed in a cloud computing environment.

SUMMARY

Embodiments of the present invention improve systems and methods for optimizing $CO_2$ emissions and financial costs for algorithms executed in a cloud computing environment. The present disclosure describes systems and methods for generating an optimized partitioning vector that define which security protocols are applied to sub operations of algorithms based on modeled and experimentally determined cost values for $CO_2$ emissions and financial costs.

In one embodiment, the present invention includes a computer implemented method comprising: determining a cloud computing category identifier corresponding to a number of processing cores in a cloud computing environment, determining a plurality of calibration parameters, transmitting the cloud computing category identifier and the plurality of calibration parameters to a cloud computing service provider, and receiving a plurality of cost values based on the cloud computing category identifier and the plurality of calibration parameters from the cloud computing service provider. The plurality of cost values describe the cost of executing a plurality of single state assignment (SSA) statements in the cloud computing environment. Such embodiments may also include mapping the plurality of cost values to a plurality of corresponding $CO_2$ emission values to generate a cost value to $CO_2$ emission calibration, wherein the plurality of $CO_2$ emissions values describe the amount of $CO_2$ produced during the execution of the plurality of SSA statements.

In one embodiment, the plurality of cost values comprises a plurality of runtime values and a plurality of power consumption values corresponding to execution of a plurality of single state assignment (SSA) statements according to the plurality of calibration parameters.

In one embodiment, the plurality of calibration parameters comprise an iteration value and a statistical method identifier.

In one embodiment, the method further comprises: determining an algorithm corresponding to a task to be completed in the cloud computing environment, generating an single state assignment (SSA) representation of the algorithm comprising a combination of the plurality of SSA statements, generating a linear program comprising the SSA representation of the algorithm, the plurality of cost values, and the $CO_2$ emission calibration, and solving the linear program to minimize a total $CO_2$ value associated with executing the SSA representation of the algorithm in the cloud computing environment.

In one embodiment, the SSA representation of the algorithm comprises secure computing protocols.

In one embodiment, the secure computing protocols comprise garbled circuits or homomorphic encryption.

In one embodiment, solving the linear program comprises iteratively evaluating each of the plurality of SSA statements based on each of the secure computing protocols.

In another embodiment, the present invention includes a non-transitory computer readable medium comprising instructions, that when executed by a computer processor cause the computer processor to be configured for: determining a cloud computing category identifier corresponding to a number of processing cores in a cloud computing environment, determining a plurality of calibration parameters, transmitting the cloud computing category identifier and the plurality of calibration parameters from the computer system to a cloud computing service provider, receiving a plurality of cost values based on the cloud computing category identifier and the plurality of calibration parameters from the cloud computing service provider, wherein the plurality of cost values describe the cost of executing a plurality of SSA statements in the cloud computing environment, and mapping the plurality of cost values to a plurality of corresponding $CO_2$ emission values to generate a cost value to $CO_2$ emission calibration, wherein the plurality of $CO_2$ emissions values describe the amount of $CO_2$ produced during the execution of the plurality of SSA statements.

In another embodiment, the present invention includes a system comprising: a computer processor, a non-transitory computer readable medium coupled to the processor and comprising instructions, that when executed by the computer processor cause the computer processor to be configured to: determine a cloud computing category identifier corresponding to a number of processing cores in a cloud computing environment, determine a plurality of calibration parameters, transmit the cloud computing category identifier and the plurality of calibration parameters to a cloud computing service provider, receive a plurality of cost values based on the cloud computing category identifier and the plurality of calibration parameters from the cloud computing service provider, wherein the plurality of cost values describe the cost of executing a plurality of SSA statements in the cloud computing environment, and map the plurality of cost values to a plurality of corresponding $CO_2$ emission values to generate a cost value to $CO_2$ emission calibration, wherein the plurality of $CO_2$ emissions values describe the amount of $CO_2$ produced during the execution of the plurality of SSA statements.

The following detailed description and accompanying drawings provide a better understanding of the nature and advantages of the present invention.

DETAILED DESCRIPTION

Figure 1:
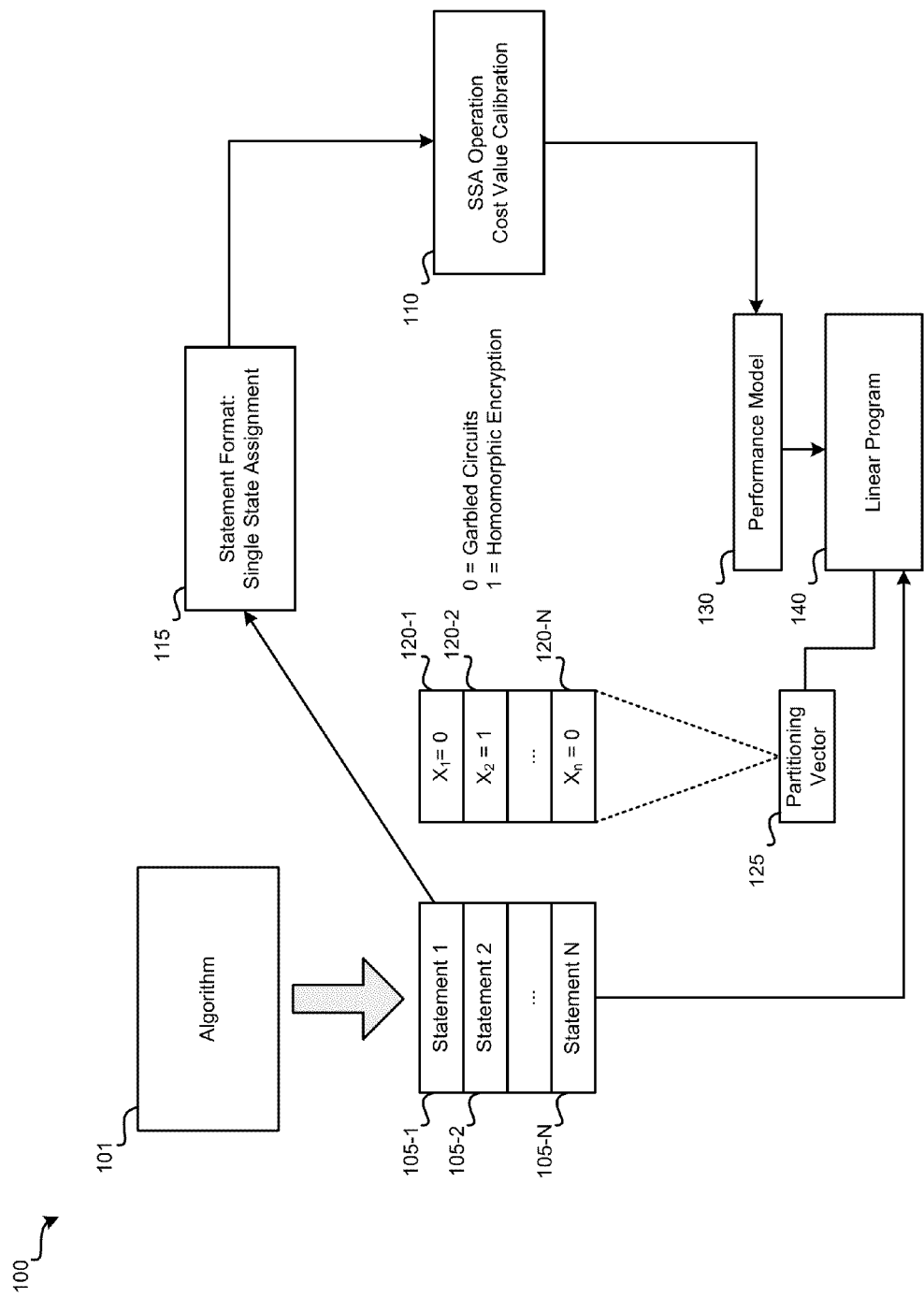
FIG. 1 is data flow of a technique for implementing secured cloud computing with mixed security protocols.

Described herein are techniques for carbon $CO_2$ optimized secure cloud computing. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Overview

Embodiments of the present disclosure include systems and methods for implementing techniques of optimizing carbon dioxide ($CO_2$) emissions when executing algorithms in a secure cloud computing environment. The techniques may include integration of a cloud computing performance model and a mechanism for runtime optimization for simultaneously optimizing runtime, $CO_2$ emissions and/or financial costs. The runtime optimization may include a linear program with coefficients in the objective function for determining $CO_2$ emissions and financial costs.

Various cloud computing environments include large numbers of processors and memories that can be configured to run algorithms for contracting entities. In many scenarios, such as financial and healthcare related applications, the cloud computing environment may execute the algorithms as a collection of individually encrypted statements to protect sensitive information while the information is in the cloud. The specific details and format of the statements and the method used to secure the statements may both contribute to the various costs of executing the algorithm with a particular configuration of the cloud computing environment, such as the number of processors dedicated to executing the encrypted statements. The costs of executing the individually encrypted statements may include the financial costs charged by the cloud computing service provider for allocating the specific resources for the time it takes to execute the encrypted statements of the algorithm. The amount of time that it takes to run all of the encrypted statements of the algorithm can depend on the type of security protocol used for each statement and the configuration of the cloud computing environment. The cost of executing an algorithm may also include the amount of $CO_2$ emitted by the cloud computing environment based on the use of power produced with $CO_2$ emitting power production, such as coal, natural gas, and other fossil fuel based energy production methods. While the amount of $CO_2$ emitted can vary based on runtime and the configuration of the given cloud computing environment, the exact amount of $CO_2$ released is difficult to model due to the dynamically changing conditions and configurations of the cloud. To determine the $CO_2$ emissions, power consumption costs may be mapped to specific $CO_2$ emission values based on power consumption information received from the cloud. For example, the power consumption information may include specifications of the power production methods used to power various groups of processing units the cloud. As used herein, the terms cloud computing environment or "cloud" can be used interchangeably to refer to any system of physical or virtual processing units or server computers that can execute executable code in series or in parallel to implement one or more applications or algorithms.

Embodiments of the present disclosure include methods for determining $CO_2$ emission calibration values directly from the cloud computing service provider based on particular cloud computing configurations and the specific statements and security protocols that can be executed. Each specific statement can be executed in the cloud some number of times to generate statistically meaningful information and cost values for runtime, power consumption, $CO_2$ emissions, financial costs, and the like. The cost values can be generated using calibration parameters that define the statistical methodology for producing the cost values. The calibration parameters may include a number of times each statement should be executed in the cloud specification and how the results of each execution should be analyzed. This process can be repeated for the statement in an encrypted format determined by one or more security protocols, such as in garbled circuits or homomorphic encryption.

Once the calibrated cost values are determined, they can be referenced in a performance model configured to predict performance of a particular cloud configuration figuration. A linear program may be generated that references the performance model to minimize any one or more of the cost values. For example, linear program may be configured to minimize the overall $CO_2$ emissions by allowing variables for security protocol, financial cost, power consumption, and or runtime to be varied. The results of the linear program may then be used to generate a partitioning vector that specifies a corresponding security protocol for each statement of the algorithm to be run in the cloud.

Data Flow for Optimizing $CO_2$ and or Financial Costs

Figure 2:
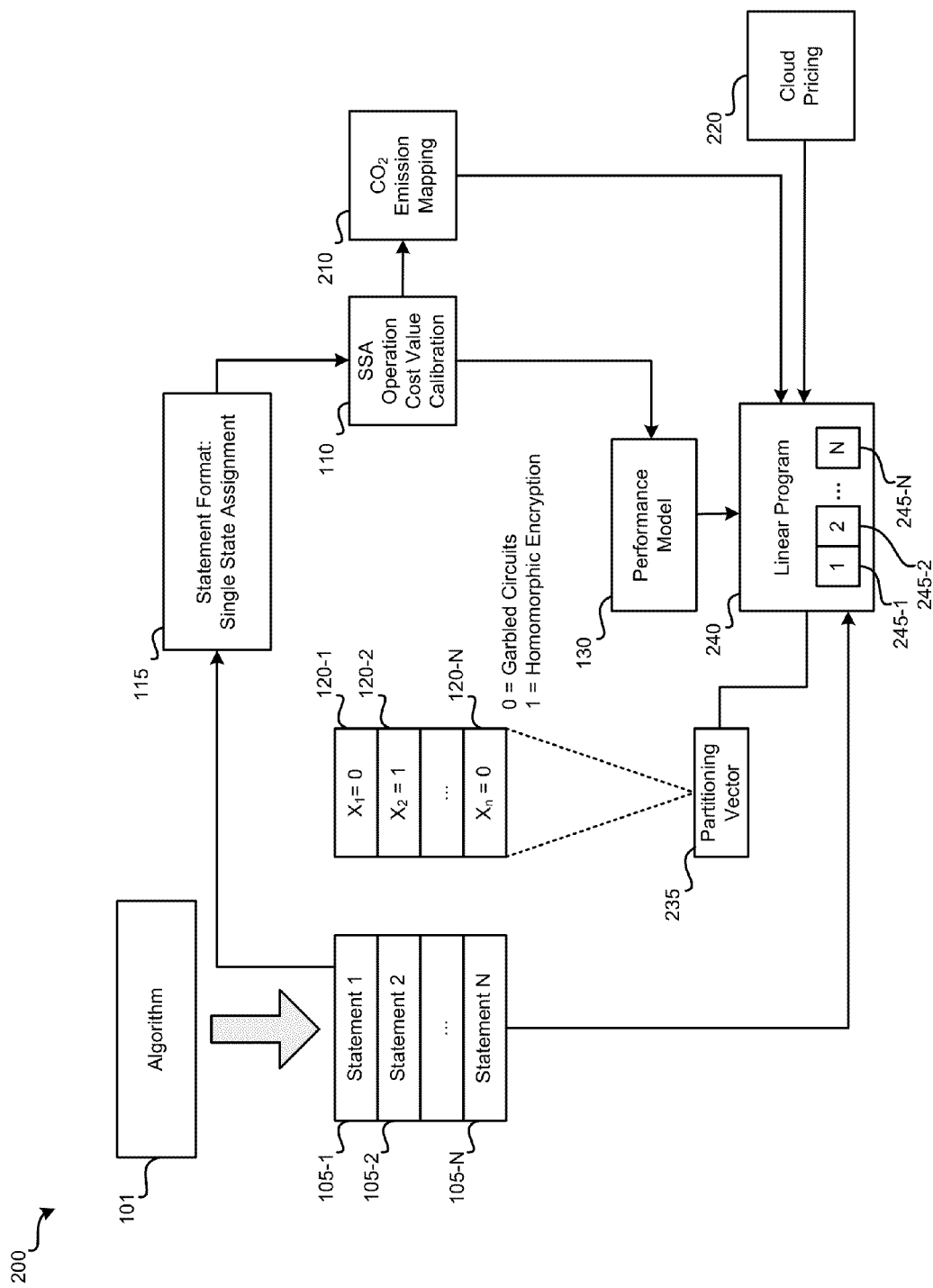
FIG. 2 is data flow of a technique for implementing secured cloud computing with mixed security protocols and optimized for $CO_2$ emissions, according an embodiment of the present disclosure.

FIG. 2 illustrates an example data flow 200 for optimizing $CO_2$ and or financial costs of executing an algorithm in a secure cloud computing environment, according to various embodiments of the present disclosure. The data flow 200 depicted in FIG. 2 may be implemented using a combination of hardware, firmware, and/or software by one or more computing systems. In the interest of simplicity and clarity, the data flow 200 will be described in reference to a single computer system in communication with a cloud computing environment over one or more communication media and/or protocols.

In an embodiment, algorithm 101 may be loaded into the computer system and may include any number of instructions for completing the task in the cloud. For example, the computer system may be a personal computer used by a developer to design, code, and optimize algorithms to be executed in the cloud. The format of the algorithm 101 may be any type of machine-readable code and generated using any number of high-level programming languages. Loading the algorithm into the computer system may include retrieving it from a non-transitory machine readable storage medium.

Once the algorithm 101 is loaded into the computer system, the computer system may convert it into a collection of individual statements 105, where each statement is an expression of a sub operation of the algorithm 101. In the particular example shown, the algorithm 101 is converted into N statements 105, where N is a natural number. The number of statements may depend on the size and complexity of the algorithm 101. Simple algorithms for accomplishing relatively simple tasks in the cloud may require relatively few statements 105, while more complex algorithms for accomplishing complicated tasks in the cloud may require significantly more statements 105. The computer system may then convert the statements 105 into individual SSA statements in which each variable is assigned exactly once. Accordingly, converting ordinary code into SSA format includes replacing the target of each assignment with a new variable, and replacing each use of a variable with the version of the variable reaching that point in the code. Thus, each SSA statement can include an assignment of a variable based on other variables and constants and one or more operands. The collection of SSA statements for a particular algorithm 101 is referred to herein as an SSA representation of algorithm 101.

With the SSA statement representation of algorithm 101, the computer system can determine the SSA operation cost value calibration 110. The SSA operation cost value calibration 110 may include runtime and/or the power consumption costs calibration information associated with executing the statements in a particular cloud computing environment. To determine the SSA operation cost value calibration 110, the computer system can send a cloud computing configuration and a number of calibration parameters to an external cloud computing service provider. The cloud computing configuration can include a cloud computing category identifier corresponding to a number of processing units to be used to implement the algorithm 101 in the cloud. The cloud computing category identifier may also correspond to a pricing structure published by the cloud computing service provider. The calibration parameters define how the cloud computing service provider should execute the calibration. For example, the calibration parameters may define how many times the cloud computing service provider should execute each one of the statements. In addition, the calibration parameters may also define which statistical method should be used to analyze the results of executing each one of the statements multiple times.

The results of each individual execution of the SSA statements may include any number of metrics or cost values corresponding to the execution of each one of the statements 105. For example, each statement 105 may be associated with a runtime cost value, a power consumption cost value, or a financial cost value. In such embodiments, a runtime cost value may include a time duration for the cloud to complete the execution of the corresponding statement. A power consumption cost value can include a measure of the power used by the cloud to execute the corresponding statement. A financial cost value may include a price charged by the cloud service provider for executing the corresponding statement. For example, the price may include a dollar value. The cloud computing service provider may then send the SSA operation cost value calibration 110 back to the computer system. Accordingly, the analysis of the results from multiple executions may include the expected cost values of executing the SSA statement. The expected cost values can then be used as the calibrated cost values. The calibrated cost values may then be compiled or included in the SSA operation cost value calibration 110.

The computer system can use the SSA operation cost value calibration 110 to generate a $CO_2$ emission mapping 210. In one embodiment, the computer system may map each calibrated power consumption cost value for each statement 105 to a $CO_2$ emission cost value. Mapping the power consumption cost values from the SSA operation cost value calibration 110 may be based on information regarding the power production source utilized by the cloud. For example, the cloud computing service provider may know that 100% of its electricity is provided by a single coal burning power plant. The specification of that coal burning power plant can then be used to determine how much $CO_2$ was produced to generated the power consumed while executing the SSA statement. In other embodiments, the conversion between power consumption and $CO_2$ emissions from electricity used from the particular coal burning power plant may be determined from information published by that power plant or inferred from specifications about the type of power plant.

The computer system can determine the performance model 130 of one or more cloud computing environments based on the cloud computing category identifier in the SSA operation cost value calibration 110. The performance model 130 may include instructions for determining how a particular category of cloud computing environments operate. Accordingly, the computer system can use the performance model 130, the SSA operation cost value calibration 110, the $CO_2$ emission mapping 210, cloud pricing 220 and the statements 105 to generate a linear program 240 with equations and variables for minimizing the $CO_2$ emissions cost value, or other cost value, associated with algorithm 101 in the cloud.

In one embodiment, linear program 240 may include information from partitioning vector 235 that includes a number of security protocols indicators 120 that describe which security protocol should be used for each corresponding statements 105. As shown, security protocol indicators 120 include binary values for indicating a security protocol, wherein "0" indicates garbled circuits and "1" indicates homomorphic encryption. The linear program 240 may determine security protocol indicators for the partitioning vector 235 in order to minimize one or more of the cost values based on the resulting encrypted statement as predicted by performance model 130. In some embodiments, the linear program 240 may also include a number of constants 245 as bit vectors in the objective function to designate which cost value, e.g., financial cost value or the $CO_2$ emission cost value, can be varied to minimize the other cost value. Accordingly, the $CO_2$ emission cost value can be constrained while allowing the financial cost value to vary in order to optimize the execution of the algorithm with respect to financial cost. The optimization performed by the linear program 240 may be repeated for a number of cloud computing categories so that the user, like a software developer, may balance the cost of adding more processing units in the cloud configuration versus the $CO_2$ emissions.

Cost Value Optimization System

Figure 3:
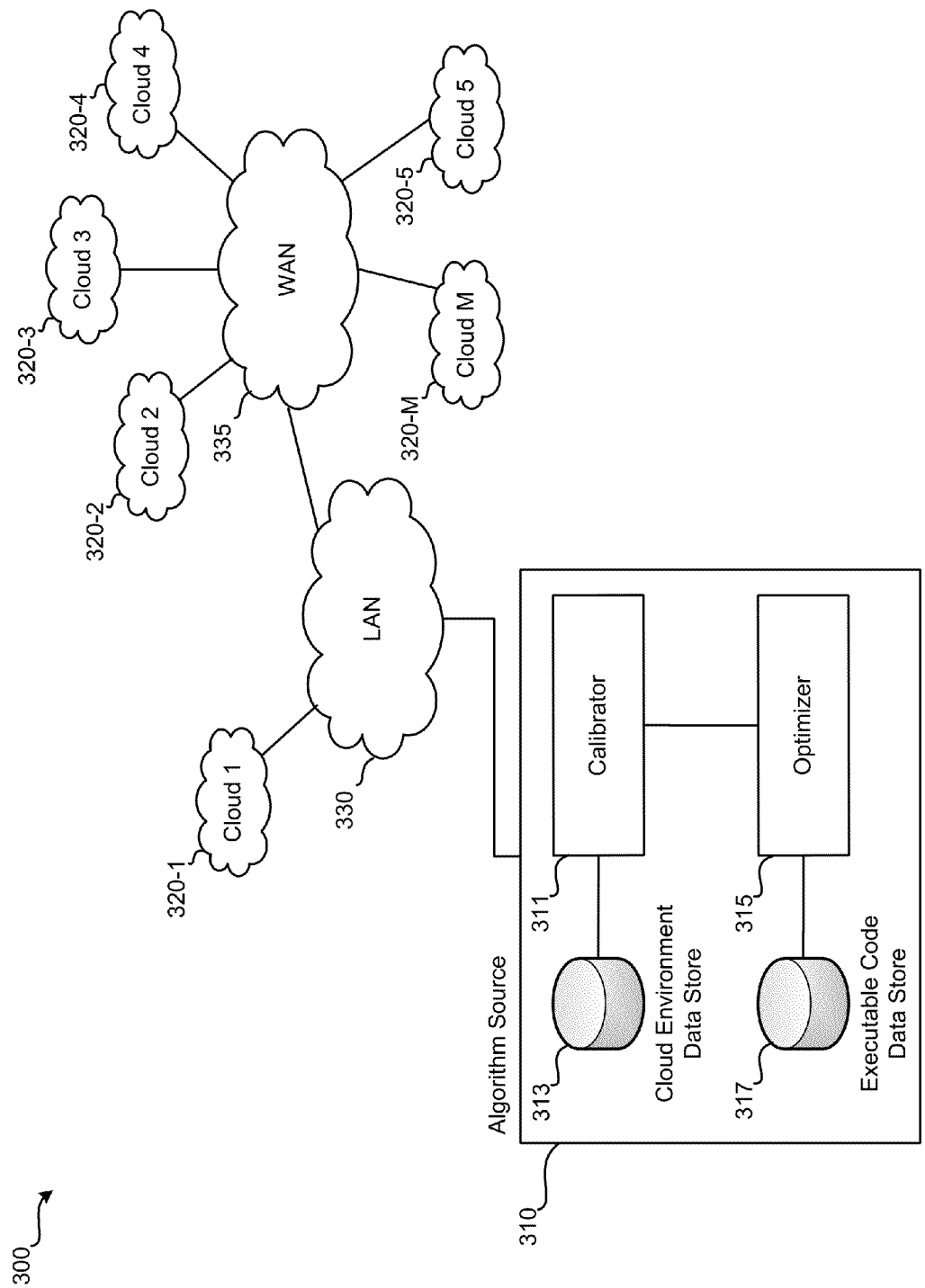
FIG. 3 is system diagram for implementing secured cloud computing with mixed security protocols and optimized for $CO_2$ emissions, according an embodiment of the present disclosure.

FIG. 3 illustrates a system 300 for generating $CO_2$ emissions optimized algorithms for deployment in one or more secure cloud computing environments. As shown the system includes an algorithm source 310, such as an end user or software developer, coupled to one or more cloud computing environments 320 through a local network (LAN) 330 and or a wide area network (WAN) 335. Each one of the cloud computing environments 320 may be configurable based on specifications received from the algorithm source 310. For example, each one of the cloud computing environments 320 may be operated by a cloud computing service provider that can configure the number of processing units, such as server computers or core processors, that will be made available to execute the SSA statement representation of an algorithm. Each cloud computing service provider may provide a pricing schedule that indicates how much they charge the algorithm source 310 based on runtime, priority, the number of processing units, and/or other factors.

The algorithm source 310, such as a software vendor or developer, may include a number of computing devices that implement the various functionality shown. For example, the algorithm source 310 may include combinations of hardware and software for implementing functionality of a calibrator 311, a cloud environment data store 313, an optimizer 315, and an executable code data store 317. The optimizer 315 may retrieve an algorithm from the executable code data store 317 and convert it into a SSA statement representation. The optimizer 315 can then send the SSA statement representation to the calibrator 311.

The calibrator 311 can then access the cloud environment data store 313 that contains information, such as capabilities and pricing structures, for any or all of the cloud computing environment 320. From the cloud environment data store 313, the calibrator 311 may also determine and/or retrieve a cloud computing category identifier that corresponds to a particular number of processing units and other specifics regarding a particular configuration of one or more cloud computing environments 320. For example, the cloud environments data store 313 may also associate pricing schedules, performance models, and stored cost value calibration files with one or more cloud computing category identifiers.

In instances in which the calibrator 311 finds a recently determined cost value calibration file associated with the particular cloud computing environment 320 and algorithm to executed in that environment, the calibrator 311 may determine to skip the calibration process and proceed directly to the optimization process. However, calibrator 311 may be configured to run a cost value calibration each time a particular algorithm is executed in one or more of the cloud computing environments 320, or it may be configured to run the calibration after a predetermined number of executions of the particular algorithm or after a set period of time. As part of its calibration process, the calibrator 311 can send the cloud computing category identifier for a desired cloud computing configuration, a number of calibration parameters, and the SSA statement representation of the algorithm to the cloud computing environment 320 associated with the cloud computing category identifier. The cloud computing environment 320 may set up the appropriate cloud computing configuration according to the cloud computing category identifier and then execute each of the SSA statements in the SSA statement representation of the algorithm according to the calibration parameters. In some embodiments, the calibrator 311 can receive the raw data from the cloud computing environment and analyze the raw data according to one or more statistical methods. For example, the calibrator 311 can receive the results of executing each one of the SSA statements the number time indicated in the calibration parameter, e.g., 25 times, and then analyze the results to generate the median value.

In another embodiment, the cloud computing environment 320 can execute the statements and perform the statistical analysis, as defined in the calibration parameters, and then send the resulting analysis back to the calibrator 311. In some embodiments, the results of the statistical analysis may include the average or median runtime cost value for executing each one of the SSA statements in one or more secure forms. The runtimes may then be mapped to corresponding $CO_2$ emission cost values and/or agent cost values. The mapping between the runtime cost values, the $CO_2$ emission cost values, and/or the financial cost values may be stored to the cloud environment data store 313 or provided to the optimizer 315.

The optimizer 315 may then generate a linear program that includes objective functions based on the performance model of the particular cloud computing environment and includes various cost value variables and partitioning vectors to optimize one or more of the cost values. For example, the linear program may include a number of variables for the cost values equal to the number objective functions for solving for corresponding cost values. Using various linear programming techniques, the cost value variables may be constrained or allowed to vary in order to optimize the desired cost value. For example, the runtime cost value may be allowed to vary in order to minimize the $CO_2$ emissions cost value. In some embodiments, the linear program may also take into consideration the partitioning vector for determining which security protocol will be used to securely execute each SSA statement of the algorithm. Using the linear program, the optimizer 315 can then automatically assign security protocols to each SSA statement to minimize one or more of the cost values.

$CO_2$ Emission and Financial Cost Calibration

Figure 4:
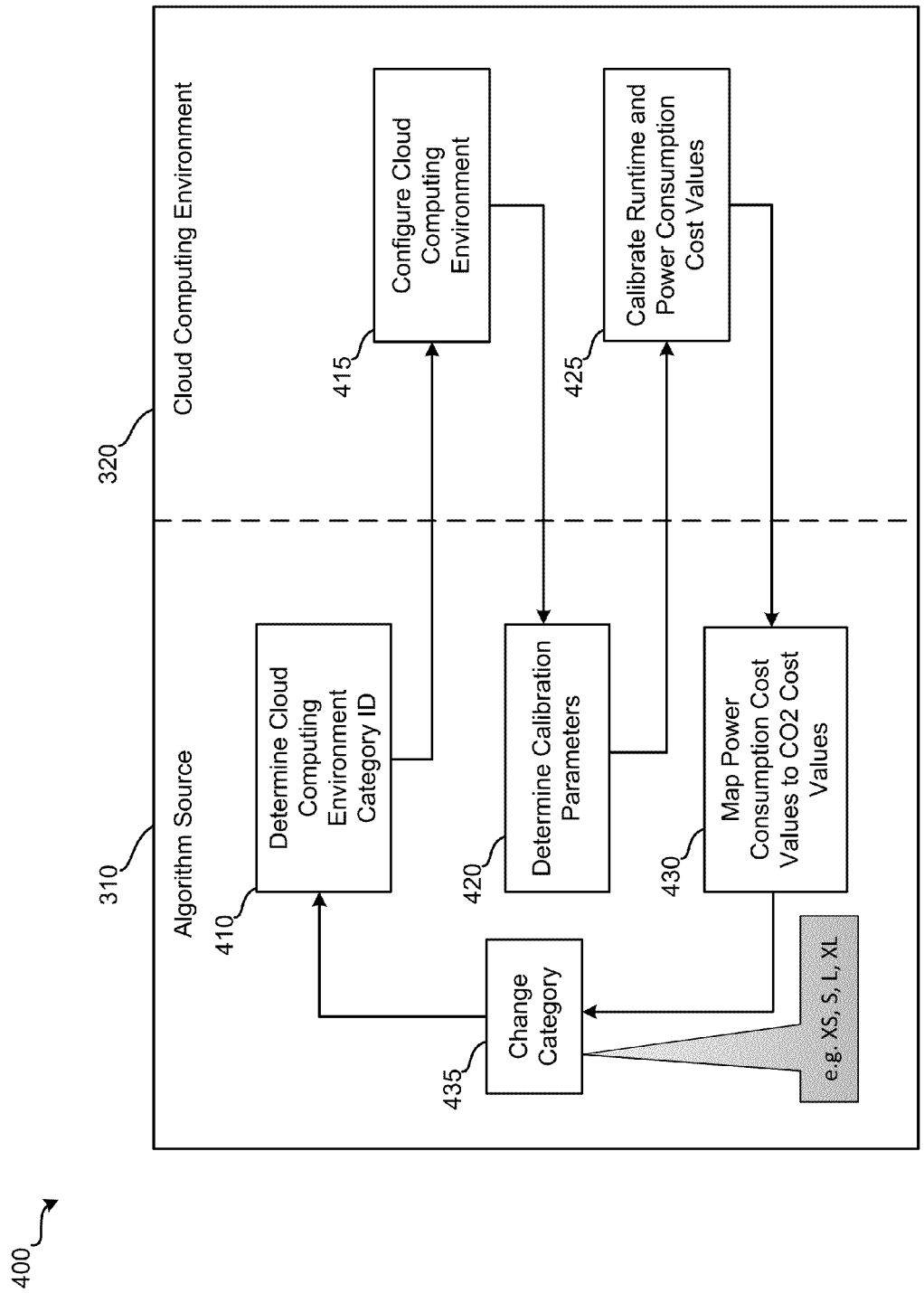
FIG. 4 is flow chart of a method for calibrating $CO_2$ emissions in a secured cloud computing environment for executing an algorithm with mixed security protocols, according an embodiment of the present disclosure.

FIG. 4 is a flowchart of a method 400 calibrating $CO_2$ emission cost values, and/or the financial cost values in secure cloud computing. The method 400 that may include interactions between an algorithm source 310 and a cloud computing environment 320. While the actions of the algorithm source 310 and the cloud computing environments 320 are shown as being interrelated, the actions of each entity can be considered independent and viewed as proceeding using information received from an external source. Method 400 may begin with the algorithm source 310 determining a particular configuration for the desired cloud computing environment and an associated cloud computing category identifier in action 410. The algorithm source 310 may then transmit the cloud computing category identifier to the cloud computing environment 320.

In action 415, the cloud computing environment 320 can set up a corresponding cloud computing configuration in response to the cloud computing category identifier. In some embodiments, setting up the cloud computing configuration may include provisioning a particular number of processing units associated with the cloud computing category identifier.

While or after the cloud computing environment 320 is sitting up the appropriate cloud computing configuration, the algorithm source 310 can determine a number of calibration parameters in action 420. For example, the algorithm source 310 may choose an iteration count value, i.e., define the number of times each relevant SSA statement will be executed in the cloud in each of one or more security protocols. The calibration parameters may also include designation of the statistical method to be used in analyzing the results of the multiple executions of the SSA statements. The algorithm source 310 can then transmit the calibration parameters to the cloud computing environment 320. In response to receiving the calibration parameters, the cloud computing environment 320 can execute the calibration. In some embodiments, executing the calibration may include associating each SSA operator with a statistically generated runtime and/or power consumption cost values based on the results of the multiple iterations. The cloud computing environment 320 may then send the cost value calibration back to the algorithm source 310.

The algorithm source 310, using the calibrator 311 executed on one or more computer systems, can map the runtime and/or the power consumption cost values to corresponding $CO_2$ emission cost values, in action 430. Mapping the runtime and/or the power consumption cost values may include retrieving published specifications from power producers or power producer types known to supply electrical power to the various components of a particular cloud computing environment 320. In some instances, more than one power producer, or more than one type of power producer, may supply electrical to the cloud computing environment. For example, one portion of the computer systems used in the cloud computing environment may be powered by a coal fueled power plant, while another portion of the computer systems may be powered by a natural gas fueled power plant. Accordingly, in some embodiments, mapping the power consumption or runtime cost values to the $CO_2$ emission cost values may include referencing multiple specifications for multiple power plants or power plant types. In such embodiments, referencing multiple specifications may include combining or weighting the specifications according the contribution each power plant makes to powering the cloud computing environment.

In action 435, the cloud computing category identifier may be changed to alter the cloud computing configuration, e.g., increase the number of processing units. Once the cloud computing environment 320 makes the corresponding changes to the cloud computing resources allocated to execute the algorithm, the calibration actions 420, 425, and 430 can be repeated to determine the $CO_2$ emission cost values for each SSA statement of the algorithm. The process can be repeated for multiple cloud computing configurations. The $CO_2$ emission cost values can then be stored or incorporated into the performance model 130 and/or the linear program 240 to optimize financial cost values or $CO_2$ emission cost values.

$CO_2$ Emission and Financial Cost Optimization

Figure 5:
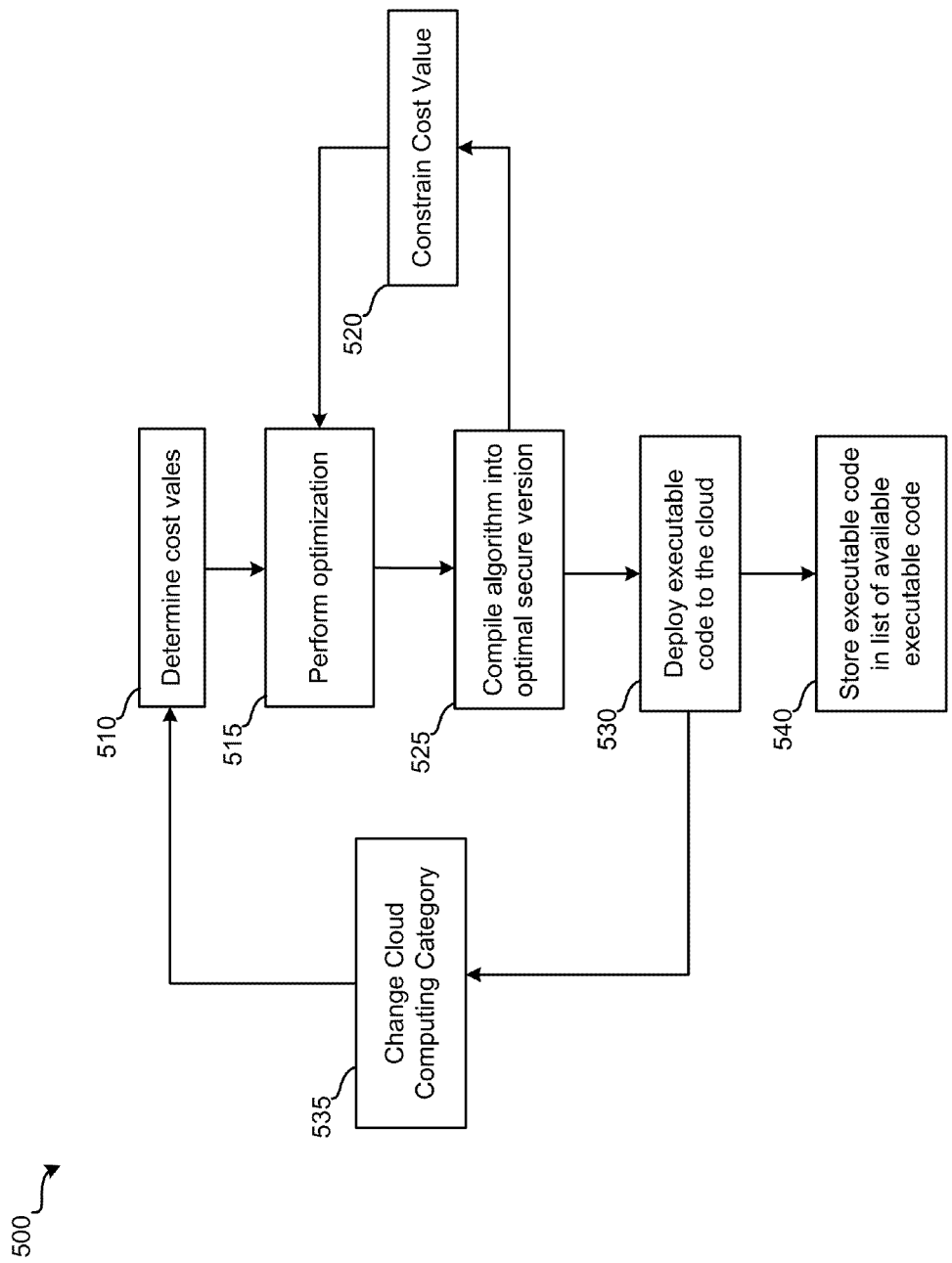
FIG. 5 is flow chart of a method for optimizing $CO_2$ emissions in the execution of an algorithm in a secured cloud computing environment with mixed security protocols, according an embodiment of the present disclosure.

FIG. 5 illustrates a method 500 for optimizing $CO_2$ emissions or financial costs, according to various embodiments of the present disclosure. Method 500 may begin with the algorithm source 310 determining one or more sets of calibrated cost values in action 510. Determining the calibrated cost values may include performing a calibration method embodiment described in reference to FIG. 4. In other embodiments, determining the calibrated cost values may include retrieving them from the cloud environment data store 313.

In action 515, the algorithm source may perform the optimization by generating and solving the linear program for a particular algorithm. The linear program may include or be based on the SSA statement representation of the algorithm and the calibrated cost values and configured to determine an optimized partitioning vector of security protocol indicators to minimize one more of the cost values, e.g., the $CO_2$ emission cost value.

In action 525, the algorithm source 310 may compile SSA statement representation of the algorithm into the optimal secure version according to the optimized partitioning vector. Accordingly, the optimal secure version of the algorithm may include a mix of garbled circuits and homomorphic encryption secured SSA statements. In some embodiments, the algorithm source may change the cost value for with the SSA statement representation of the algorithm is to be optimized. Accordingly, in action 520 the algorithm source may define which cost types will be constrained, and then rerun the optimization in action 515. Fixing which cost type will be constrained may include setting a one or more bits in a bit vector included in the linear program.

In some embodiments, once the optimal secure version of the algorithm is compiled in action 525, the algorithm source 310 may change the configuration of the cloud computing environment 320 in action 535 by changing the cloud computing environment category identifier. By changing the cloud computing configuration, algorithm source 310 can determine an optimized partitioning vector and a corresponding optimal secure version of the algorithm for secure execution in that cloud computing configuration, in actions 510, 515, 520, and 525. When the algorithm source 310 is satisfied with the optimized cost values, it may deploy the executable code to the cloud computing environment for execution in action 530. In action 540, the algorithm source 310 may store the executable code associated with the corresponding cloud computing environment category identifier, the calibrated cost values, and an indication for which cost value executable code was optimized.

Figure 6:
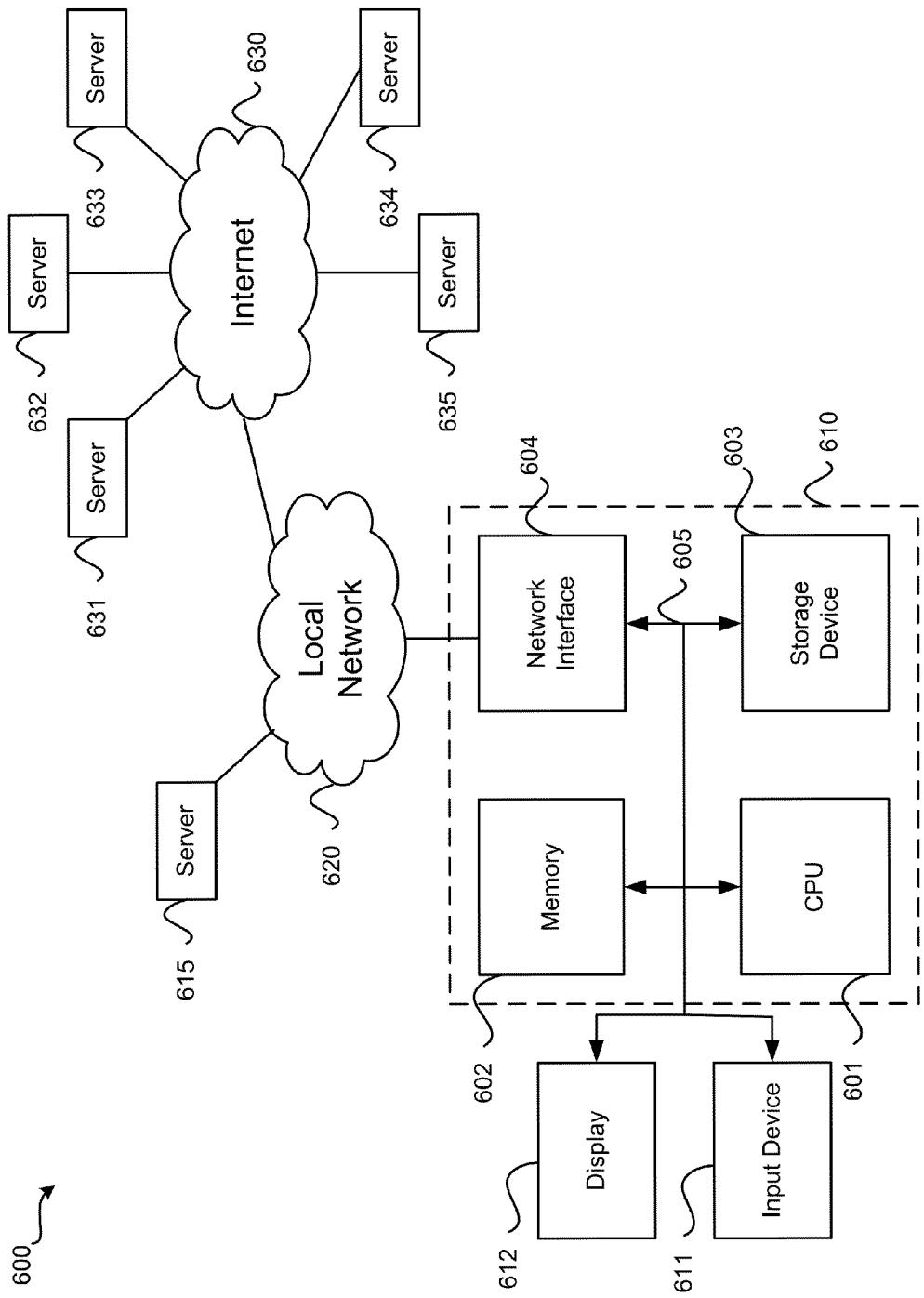
FIG. 6 illustrates an example computer system that can be used to implement various embodiments of the present disclosure.

FIG. 6 illustrates an example computer system and networks that may be used to implement one embodiment of the present disclosure. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including instructions for performing the techniques described above. This memory may also be used for storing temporary variables or other intermediate information during execution of instructions to be executed by processor 601. Possible implementations of this memory may be, but are not limited to, random access memory (RAM), read only memory (ROM), or both. A storage device 603 is also provided for storing information and instructions. The information instructions can be in the form of computer readable code stored on the storage device, accessible and executable by processor to implement various techniques and methods of the present disclosure. Common forms of storage devices include non-transient, non-volatile computer readable media, for example, a hard drive, a magnetic disk, an optical disk, a CD, a DVD, a flash memory, a USB memory card, or any other medium from which a computer can read.

Computer system 610 may be coupled via the same or different information bus, such as bus 605, to a display 612, such as a cathode ray tube (CRT), touchscreen, or liquid crystal display (LCD), for displaying information. An input device 611 such as a keyboard and/or mouse is coupled to a bus for communicating information and command selections from the user to processor 601. The combination of these components allows the user to communicate with the system.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 604 sends and receives electrical, electromagnetic, or optical signals that carry digital data streams representing various types of information.

Computer system 610 can send and receive information, including messages or other interface actions, through the network interface 604 to an Intranet or the Internet 630. In the Internet example, software components or services may reside on multiple different computer systems 610 or servers 631 across the network. Software components described above may be implemented on one or more servers. A server 631 may transmit messages from one component, through Internet 630, local network 620, and network interface 604 to a component or container on computer system 610, for example. Software components of a composite application may be implemented on the same system as other components, or on a different machine than other software components. This process of sending and receiving information between software components or one or more containers may be applied to communication between computer system 610 and any of the servers 631 to 635 in either direction. It may also be applied to communication between any two servers 631 to 635.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for reducing carbon dioxide emissions during secure execution of an application in a cloud computing environment, the method comprising:

determining, in a computer system, a cloud computing category identifier corresponding to a number of processing cores in the cloud computing environment;

determining, in the computer system, a plurality of calibration parameters that define a statistical methodology for producing a plurality of cost values, wherein the calibration parameters include a number of times the application or portion thereof is to be executed in the cloud computing environment;

transmitting the cloud computing category identifier and the plurality of calibration parameters from the computer system to a cloud computing service provider associated with the cloud computing environment;

receiving, in the computer system, the plurality of cost values based on the cloud computing category identifier and the plurality of calibration parameters from the cloud computing service provider;

partitioning, by a optimizer component of the computer system, the application into a plurality of single state assignment (SSA) statements to optimize execution of the application as a whole, wherein the plurality of cost values describes the cost of executing the plurality of SSA statements in the cloud computing environment;

mapping, in the computer system, the plurality of cost values to a plurality of corresponding carbon dioxide ($CO_2$) emissions values to generate a cost value to $CO_2$ emission calibration, wherein the plurality of $CO_2$ emissions values describe the amount of $CO_2$ produced during the execution of each of the plurality of SSA statements in the cloud computing environment;

iteratively evaluating each of the plurality of SSA statements based on each of a plurality of security protocols, wherein the plurality of security protocols comprises at least a garbled circuit security protocol and a homomorphic security protocol;

assigning at least one security protocol of the plurality of security protocols to each of the plurality of SSA statements to minimize CO2 emissions values during execution of the application;

generating a partitioning vector representing the assignment of each of the security protocols to each of the corresponding SSA statements; and sending the SSA statements to the cloud computing environment for execution using the security protocols defined by the partitioning vector.

2. The method of claim 1 wherein the plurality of cost values comprises a plurality of runtime values and a plurality of power consumption values corresponding to execution of a plurality of single state assignment (SSA) statements according to the plurality of calibration parameters.

3. The method of claim 2 wherein the plurality of calibration parameters comprise an iteration value and a statistical method identifier.

4. The method of claim 1 further comprising:
determining, in the computer system, an algorithm corresponding to a task to be completed in the cloud computing environment;
generating, in the computer system, a single state assignment (SSA) representation of the algorithm comprising a combination of the plurality of SSA statements;
generating, in the computer system, a linear program comprising the SSA representation of the algorithm, the plurality of cost values, and the $CO_2$ emission calibration; and solving, in the computer system, the linear program to minimize a total $CO_2$ value associated with executing the SSA representation of the algorithm in the cloud computing environment.

5. The method of claim 4 wherein solving the linear program comprises iteratively evaluating each of the plurality of SSA statements based on each of the secure computing protocols.

6. A non-transitory computer readable medium comprising instructions, that when executed by a computer processor, cause the computer processor to be configured for reducing carbon dioxide emissions during secure execution of an application in a cloud computing environment, the instructions operable to perform operations comprising:

determining a cloud computing category identifier corresponding to a number of processing cores in the cloud computing environment;

determining a plurality of calibration parameters that define a statistical methodology for producing a plurality of cost values, wherein the calibration parameters include a number of times the application or portion thereof is to be executed in the cloud computing environment;

transmitting the cloud computing category identifier and the plurality of calibration parameters from the computer system to a cloud computing service provider associated with the cloud computing environment;

receiving the plurality of cost values based on the cloud computing category identifier and the plurality of calibration parameters from the cloud computing service provider;

partitioning, by a optimizer component of the computer system, the application into a plurality of single state assignment (SSA) statements to optimize execution of the application as a whole, wherein the plurality of cost values describes the cost of executing the plurality of SSA statements in the cloud computing environment;

mapping the plurality of cost values to a plurality of corresponding carbon dioxide ($CO_2$) emissions values to generate a cost value to $CO_2$ emission calibration, wherein the plurality of $CO_2$ emissions values describe the amount of $CO_2$ produced during the execution of each of the plurality of SSA statements in the cloud computing environment;

iteratively evaluating each of the plurality of SSA statements based on each of a plurality of security protocols, wherein the plurality of security protocols comprises at least a garbled circuit security protocol and a homomorphic security protocol;

assigning at least one security protocol of the plurality of security protocols to each of the plurality of SSA statements to minimize CO2 emissions values during execution of the application;

generating a partitioning vector representing the assignment of each of the security protocols to each of the corresponding SSA statements; and sending the SSA statements to the cloud computing environment for execution using the security protocols defined by the partitioning vector.

7. The non-transitory computer readable medium of claim 6 wherein the plurality of cost values comprises a plurality of runtime values and a plurality of power consumption values corresponding to execution of a plurality of single state assignment (SSA) statements according to the plurality of calibration parameters.

8. The non-transitory computer readable medium of claim 7 wherein the plurality of calibration parameters comprises an iteration value and a statistical method identifier.

9. The non-transitory computer readable medium of claim 6 further comprising instructions, that when executed by the computer processor, cause the computer processor to be configured for:
- determining an algorithm corresponding to a task to be completed in the cloud computing environment;
- generating a single state assignment (SSA) representation of the algorithm comprising a combination of the plurality of SSA statements;
- generating a linear program comprising the SSA representation of the algorithm, the plurality of cost values, and the $CO_2$ emission calibration; and
- solving the linear program to minimize a total $CO_2$ value associated with executing the SSA representation of the algorithm in the cloud computing environment.

10. A system comprising:
- a computer processor;
- a non-transitory computer readable medium coupled to the processor and comprising instructions, that when executed by the computer processor, cause the computer processor to be configured to reduce carbon dioxide emissions during secure execution of an application in a cloud computing environment, wherein the computer processor is configured to:
- determine a cloud computing category identifier corresponding to a number of processing cores in the cloud computing environment;
- determine a plurality of calibration parameters that define a statistical methodology for producing a plurality of cost values, wherein the calibration parameters include a number of times the application or portion thereof is to be executed in the cloud computing environment;
- transmit the cloud computing category identifier and the plurality of calibration parameters to a cloud computing service provider associated with the cloud computing environment;
- receive the plurality of cost values based on the cloud computing category identifier and the plurality of calibration parameters from the cloud computing service provider;
- partition, by a optimizer component of the computer system, the application into a plurality of single state assignment (SSA) statements to optimize execution of the application as a whole, wherein the plurality of cost values describes the cost of executing the plurality of SSA statements in the cloud computing environment;
- map the plurality of cost values to a plurality of corresponding carbon dioxide ($CO_2$) emissions values to generate a cost value to $CO_2$ emission calibration, wherein the plurality of $CO_2$ emissions values describe the amount of $CO_2$ produced during the execution of each of the plurality of SSA statements in the cloud computing environment;
- iteratively evaluate each of the plurality of SSA statements based on each of a plurality of security protocols, wherein the plurality of security protocols comprises at least a garbled circuit security protocol and a homomorphic security protocol;
- assign at least one security protocol of the plurality of security protocols to each of the plurality of SSA statements to minimize $CO_2$ emissions values during execution of the application;
- generate a partitioning vector representing the assignment of one of the security protocols to each one of the corresponding SSA statements; and
- send the SSA statements to the cloud computing environment for execution using the security protocols defined by the partitioning vector.

11. The system of claim 10 wherein the plurality of cost values comprises a plurality of runtime values and a plurality of power consumption values corresponding to execution of a plurality of single state assignment (SSA) statements according to the plurality of calibration parameters.

12. The system of claim 11 wherein the plurality of calibration parameters comprises an iteration value and a statistical method identifier.

13. The system of claim 10 wherein the instructions further cause the computer processor to be configured to:
- determine an algorithm corresponding to a task to be completed in the cloud computing environment;
- generate a single state assignment (SSA) representation of the algorithm comprising a combination of the plurality of SSA statements;
- generate a linear program comprising the SSA representation of the algorithm, the plurality of cost values, and the $CO_2$ emission calibration; and
- solve the linear program to minimize a total $CO_2$ value associated with executing the SSA representation of the algorithm in the cloud computing environment.

* * * * *